United States Patent [19]

Arai

[11] 4,190,339

[45] Feb. 26, 1980

[54] RETRACTING AND RAISING TYPE MIRROR DRIVE DEVICE IN SINGLE-LENS REFLEX CAMERA

[75] Inventor: Akihiro Arai, Urawa, Japan

[73] Assignee: Asahi Kogaku Kogyo Kabushiki Kaisha, Tokyo, Japan

[21] Appl. No.: 911,262

[22] Filed: May 31, 1978

[30] Foreign Application Priority Data

May 31, 1977 [JP] Japan .................................. 52-63548

[51] Int. Cl.² ............................................ G03B 19/12
[52] U.S. Cl. .................................................. 354/156
[58] Field of Search ................. 354/152, 154, 156, 55, 354/56

[56] References Cited

U.S. PATENT DOCUMENTS

| | | | |
|---|---|---|---|
| 3,391,626 | 7/1968 | Ettischer et al. | 354/156 |
| 3,468,232 | 9/1969 | Knapp | 354/156 |
| 3,568,585 | 3/1971 | Ishizaka | 354/156 |
| 3,601,027 | 8/1971 | Ono | 354/55 |
| 4,068,246 | 1/1978 | Arai | 354/156 |

Primary Examiner—John Gonzales
Attorney, Agent, or Firm—Sughrue, Rothwell, Mion, Zinn and Macpeak

[57] ABSTRACT

A device for simultaneously raising and retracting a mirror in a single-lens reflex camera is achieved by providing on each side of the mirror two coupling shafts pivotally secured at spaced positions to the side of the mirror and pivotally supported at their other ends on spaced apart pivot shafts.

5 Claims, 4 Drawing Figures

RETRACTING AND RAISING TYPE MIRROR DRIVE DEVICE IN SINGLE-LENS REFLEX CAMERA

BACKGROUND OF THE INVENTION

It is well known that, in general, a single-lens reflex camera has a movable mirror behind the photographing lens, and switching between the photographing state and the viewing state is accomplished by moving the mirror. The movement of the mirror end it greatly limited by the photographing lens and the film or the shutter is provided behind the mirror so that the size of the mirror is limited to a certain value. This invention relates to a so-called retracting and raising type mirror drive device for a camera in which, in spite of the above-described conditions, the size of the mirror is increased in order to transmit as much light as possible, and in which device at the time of photographing the mirror is not only swung but moved, or retracted, away from the photographing lens. Mirror drive devices of this type are intricate in construction and usually include a number of sliding components which require a relatively great force to operate.

SUMMARY OF THE INVENTION

Accordingly, an object of this invention is to provide a retracting and raising type mirror drive device having a simple construction in which no sliding parts are employed. Briefly, this is accomplished by providing a link mechanism consisting of four members and rotatable through pivot shaft so that the device can be operated with a relatively small force. The mirror drive device according to the invention can also be employed as a reflection mirror unit for a light measuring device.

BRIEF DESCRIPTION OF THE DRAWINGS

One embodiment of this invention will be described with reference to the accompanying drawings, in which.

DETAILED DESCRIPTION OF THE INVENTION

Figure 1:
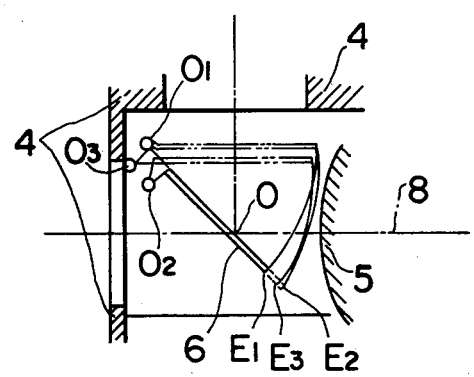
FIG. 1 is an explanatory diagram showing various loci of a mirror end caused by varying the position of the pivot shaft.

FIG. 1 is an explanatory diagram showing the locus of the end of a mirror. In FIG. 1, reference numerals 4, 5 and 6 designate a body, a lens limit region, and a mirror, respectively. The mirror 6 is limited by the lens limit region 5 at the front and by the body 4 at the rear. The body 4 includes a film or a shutter, although it is indicated only as the body 4 in FIG. 1 for ease of explanation. Since the mirror 6 is a so-called swingable mirror, it is turned (or swung) around a pivot axis $O_1$. The end of the mirror is indicated by reference character $E_1$. If the pivot axis is moved downward to a position $O_2$ so that it is spaced apart from the mirror 6, then the mirror end can be extended to a point $E_2$. However, since the pivot axis is lower, it is impossible when raising the mirror to pull the mirror completely out of the way and, accordingly, the mirror may block the photographing light beam. This difficulty may be overcome by moving the position of the pivot axis from $O_1$ to $O_3$ in which case the mirror end can be extended to a position $E_3$. However, the pivot axis cannot occupy the position $O_3$ due to interference by the body 4 with the pivoting operation of the mirror.

Figure 2:
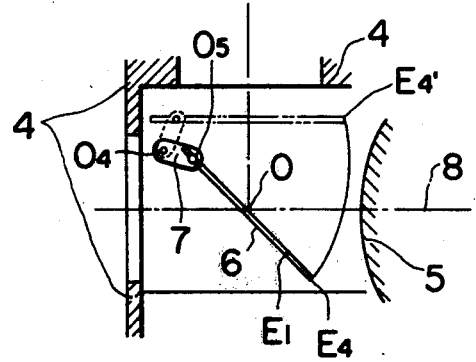
FIG. 2 is an explanatory diagram for a description of the principle of retracting the mirror according to the present invention.

In order to overcome this drawback, an articulated mechanism as shown in FIG. 2 is provided according to the invention in which the mirror 6 is supported by a supporting arm 7 in such a manner that the latter 7 is articulated with the mirror through a shaft $O_5$. In this case, the length $\overline{O_4E_4}$ from the pivot shaft $O_4$ to the mirror end $E_4$ obtained with the object is viewed through the mirror can be made longer than the distance $\overline{O_4E_4'}$ obtained when the object is photographed. Furthermore, if the distance between the mirror 6 and the pivot shaft $O_4$ is increased, the mirror end can be further extended and the mirror can be raised even higher above the photographing light beam.

Figure 3:
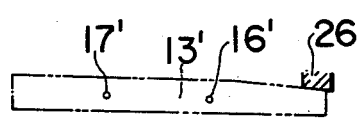
FIG. 3 is a side view of one embodiment of this invention obtained when an object is viewed through the camera.
Figure 3:
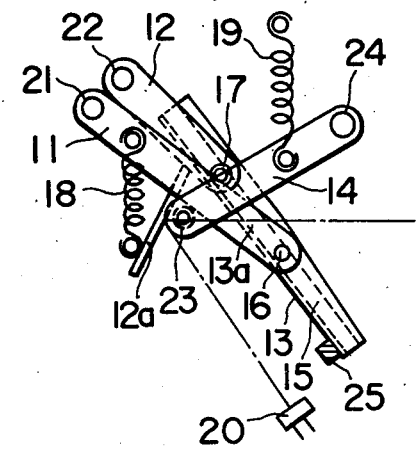
Figure 4:
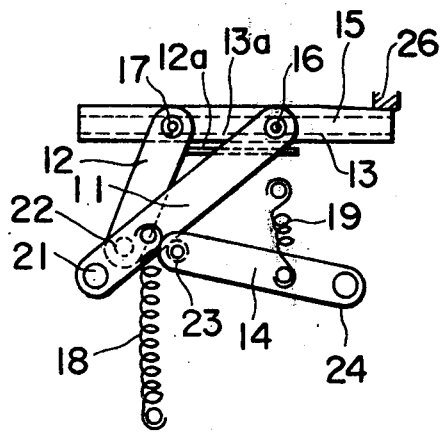
FIG. 4 is also a side view of the embodiment of the invention obtained when the object is photographed with the camera.

One embodiment of this invention is shown in FIGS. 3 and 4. One end of a supporting arm 12 is rotatably mounted on a pivot shaft 22 secured to the body, and the other end of the supporting arm 12 is coupled to a coupling shaft 17 which, in turn, is coupled to a mirror sheet 13 on which a mirror 15 is provided. In this way, the retracting and raising mechanism described with respect to FIG. 2 is formed. In addition, a drive arm 11 having a pivot shaft 21 is coupled through a coupling shaft 16 to the mirror sheet 13, thus forming a link mechanism which includes the body, the drive arm 11, the mirror sheet 13 and the supporting arm 12. As the drive arm 11 is energized by a spring 18, the link mechanism is moved in its entirety, as a result of which the mirror sheet 13 is abutted against a stopper 25. A raising lever 14 whose pivot shaft 24 is secured to the body operates to move the drive arm 11 through a raising pin 23. Although the raising lever 14 is energized by a spring 19, it is normally locked in its downward position (FIG. 3) by a locking mechanism (not shown).

The operation of the device described above will now be described. If a locking means (not shown) is released for photographing an object, then the raising lever 14 is turned by means of the spring 19 which is stronger than spring 18, and the drive arm 11 is therefore turned by the raising pin 23 against the elastic force of the spring 18. Therefore, the link mechanism is operated and the mirror 15 is raised and pulled in until the mirror sheet 13 is stopped by the stopper 26. In this operation, the mirror 15 is retracted and raised by means of the supporting arm 12 and the coupling shaft 17. Furthermore, when the raising lever 14 is restored by using a restoring mechanism (not shown), the drive arm 11 is free to be restored by the action of the spring 18. As a result, the link mechanism is restored and the mirror sheet 13 is therefore restored until it is stopped by the stopper 25. A description of the locking mechanism and the restoring mechanism will be omitted since they are well known in the art.

In the above-described embodiment, the part 11 is employed as the drive arm; however, as will be obvious to one of ordinary skill in the art, the part 12 may be employed instead as the drive arm.

As is apparent from the above description, a retracting and raising type mirror drive mechanism has been provided by utilizing the link mechanism. Since this mirror drive mechanism has no sliding section, its operation is smooth and stable, and its construction is simple.

A variety of methods have been proposed in which a part of the mirror 15 is formed as a light transmission section for allowing the light from the photographing lens to transmit therethrough, and an opening section 13a is formed in the mirror sheet 13 in correspondence to the light transmission section, whereby the transmitted light is reflected by a sub-mirror to thereby be measured by a light receiving element. In such a light measuring device, it is possible that, as shown in FIGS. 3 and 4, the supporting lever 12 is provided with a sub-mirror 12a which from an optical system adapted to introduce the light beam to the light receiving element 20, and during photographing the opening section 13a of the mirror sheet is closed by the sub-mirror 12a so as to protect the viewing optical system from the photographing light beam. Accordingly, the device according to the invention can be also used as a drive unit for a light measuring sub-mirror.

What is claimed is:

1. A mirror drive device for a single lens reflex camera of the type in which a mirror is movable between viewing and photographing positions, is mounted on a mirror supporting member within a camera body and is simultaneously pivoted and retracted out of the optical photographing path and into the photographing position in order to expose the camera lens to the photographic film, the device comprising:

first and second pivot shafts provided on said camera body and fixed in position with respect to said camera body, first and second coupling shafts provided on said mirror supporting member along a single edge thereof and first and second pivot arms, said first pivot arm being pivotally connected at one end thereof to said first pivot shaft and at the other end thereof to said first coupling shaft and said second pivot arm being pivotally connected at one end thereof to said second pivot shaft and at the other end thereto to said second coupling shaft, a first spring means coupled at one end thereof to one of said pivot arms and at the other end thereof to said camera body to pull said mirror towards said viewing position, a raising lever pivotally connected at one end thereof to said camera body and having a pin at the other end thereof in contact with one of said pivot arms, and a second spring means coupled at one end thereof to said camera body and at the other end thereof to said raising lever, said second spring means urging said pin against said pivot arm to move said pivot arm so as to raise said mirror from the viewing position to the photographing position.

2. A mirror drive device as claimed in claim 1, wherein said pivot shafts are positioned adjacent the rearmost edge of said mirror supporting member.

3. A mirror drive device as claimed in claims 1 or 2, wherein the improvement further comprises:

at least one part of said mirror forming a light transmission section;

said mirror supporting member having an opening therein corresponding to said light transmission section;

a light-receiving element disposed out of the photographing optical path; and a sub-mirror mounted on at least one of said pivot arms, said sub-mirror, when said mirror is in said viewing position reflecting light from said lens, said light transmission section and said opening onto said light receiving element and, when said mirror is in its photographing position, blocking light from entering through said light transmission section and opening.

4. A mirror drive device as claimed in claim 1, wherein said second spring means is stronger than said first spring means.

5. The mirror drive device as claimed in claim 4, further comprising releasable locking means for holding said raising lever in the position corresponding to the viewing position of said mirror until released whereupon said mirror moves from the viewing position to the photographing position.

* * * * *